United States Patent
Park et al.

(10) Patent No.: US 11,063,464 B2
(45) Date of Patent: Jul. 13, 2021

(54) APPARATUS AND METHOD FOR ALTERING WIRELESS CHARGING MODE

(71) Applicant: Samsung Electronics Co., Ltd., Suwon-si (KR)

(72) Inventors: Han Seok Park, Seoul (KR); Young Mi Ha, Suwon-si (KR); Kang Ho Byun, Yongin-si (KR); Min Ho Kang, Suwon-si (KR); Dong Zo Kim, Yongin-si (KR); Se Ho Park, Yongin-si (KR); Keum Su Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 16/315,969

(22) PCT Filed: Jul. 5, 2017

(86) PCT No.: PCT/KR2017/007145
§ 371 (c)(1),
(2) Date: Jan. 7, 2019

(87) PCT Pub. No.: WO2018/008963
PCT Pub. Date: Jan. 11, 2018

(65) Prior Publication Data
US 2019/0326768 A1    Oct. 24, 2019

(30) Foreign Application Priority Data
Jul. 7, 2016    (KR) ................ 10-2016-0086040

(51) Int. Cl.
*H02J 7/00* (2006.01)
*H02J 7/02* (2016.01)
(Continued)

(52) U.S. Cl.
CPC .............. *H02J 7/025* (2013.01); *H02J 7/027* (2013.01); *H02J 7/04* (2013.01); *H02J 50/12* (2016.02); *H02J 50/20* (2016.02); *H02J 50/80* (2016.02)

(58) Field of Classification Search
USPC ........................................... 320/108
See application file for complete search history.

(56) References Cited

U.S. PATENT DOCUMENTS

| 8,957,053 B2 | 2/2015 | Betageri et al. |
| 9,445,995 B2 | 9/2016 | Betageri et al. |

(Continued)

FOREIGN PATENT DOCUMENTS

| KR | 10-2007-0110114 A | 11/2007 |
| KR | 10-2011-0127243 A | 11/2011 |

(Continued)

OTHER PUBLICATIONS

ISA/KR, "International Search Report and Written Opinion of the International Searching Authority," International Application No. PCT/US2017/007145, dated Oct. 23, 2017, 16 pages.

*Primary Examiner* — Samuel Berhanu

(57) ABSTRACT

An apparatus for changing a wireless charging mode includes a power receiving antenna configured to receive power from a power supply using a first frequency band, a communication circuit configured to communicate with the power supply using a second frequency band, a power management circuit configured to charge a battery using the received power, and a control circuit configured to be electrically connected with the power management circuit. In addition, various embodiments ascertained through the specification are possible.

12 Claims, 9 Drawing Sheets

(51) Int. Cl.
*H02J 50/80* (2016.01)
*H02J 50/12* (2016.01)
*H02J 50/20* (2016.01)
*H02J 7/04* (2006.01)

(56) References Cited

U.S. PATENT DOCUMENTS

| | | |
|---|---|---|
| 9,623,033 B2 | 4/2017 | Betageri et al. |
| 9,793,738 B2 | 10/2017 | Jacobs et al. |
| 9,844,557 B2 | 12/2017 | Betageri et al. |
| 2006/0197753 A1 | 9/2006 | Hotelling |
| 2008/0088602 A1 | 4/2008 | Hotelling |
| 2010/0225270 A1 | 9/2010 | Jacobs et al. |
| 2011/0279226 A1 | 11/2011 | Chen et al. |
| 2012/0248891 A1* | 10/2012 | Drennen ............ H02J 7/025 307/104 |
| 2013/0154552 A1* | 6/2013 | Siessegger ......... H02J 7/0042 320/108 |
| 2013/0249481 A1 | 9/2013 | Jacobs et al. |
| 2013/0307473 A1* | 11/2013 | Han .................. H02J 50/10 320/108 |
| 2014/0111018 A1* | 4/2014 | Kwon ................. H02J 5/005 307/104 |
| 2015/0153895 A1 | 6/2015 | Hotelling |
| 2016/0070399 A1 | 3/2016 | Hotelling |
| 2018/0217709 A1 | 8/2018 | Hotelling |
| 2018/0303850 A1 | 10/2018 | Betageri et al. |

FOREIGN PATENT DOCUMENTS

| | | |
|---|---|---|
| KR | 10-2012-0133306 A | 12/2012 |
| KR | 10-2013-0128565 A | 11/2013 |
| KR | 10-1476103 B1 | 12/2014 |
| KR | 10-2015-0032939 A | 3/2015 |

* cited by examiner

APPARATUS AND METHOD FOR ALTERING WIRELESS CHARGING MODE

CROSS-REFERENCE TO RELATED APPLICATIONS

This application is a 371 National Stage of International Application No. PCT/KR2017/007145, filed Jul. 5, 2017, which claims priority to Korean Patent Application No. 10-2016-0086040, filed Jul. 7, 2016, the disclosures of which are herein incorporated by reference in their entirety.

BACKGROUND

1. Field

The present disclosure relates to technologies of changing a charging mode during wireless charging.

2. Description of Related Art

An electronic device such as a smartphone is driven using power stored in its battery. For example, the electronic device receives power from a charger through a cable connected with the electronic device to charge the battery.

Furthermore, recently, the electronic device has started to support wireless charging capable of charging the battery without a cable or a contact terminal. The wireless charging may be roughly classified as an inductive charging technique or a resonant inductive coupling technique.

In the inductive charging technique therebetween, when the electronic device is put on a wireless charging pad, a battery of the electronic device may be charged by electromagnetic induction between a transmit coil in the wireless charging pad and a receive coil in the electronic device. In the resonant inductive coupling technique, a power supply resonates, transferring electrical energy to an electronic device having the same frequency as electric energy which resonates.

SUMMARY

According to a conventional resonant inductive coupling technique, an electronic device does not determine a type of a travel adaptor (TA) connected to a power supply and a level of power capable of being supplied from the power supply. Thus, there is a problem incapable of changing a charging mode depending on a type of the TA.

Furthermore, according to the conventional resonant inductive coupling technique, when the power supply immediately increases or decreases power in response to a time when the electronic device sharply changes a level of current to be supplied to a power management circuit, there is a risk that a circuit will be damaged.

Moreover, according to the conventional resonant inductive coupling technique, when the electronic device is turned on, a control circuit in the electronic device may initialize the power management circuit and a communication circuit. Thus, there is a problem in which charging may be stopped when the electronic device is turned on and in which a voltage drop may occur as current consumption increases.

To address the above-mentioned problems and/or purposes disclosed in the present disclosure, an aspect of the present disclosure is to provide an apparatus for changing a charging mode during wireless charging and a user terminal therefor.

In accordance with an aspect of the present disclosure, an electronic device is provided. The electronic device may include a power receiving antenna configured to receive power from a power supply using a first frequency band, a communication circuit configured to communicate with the power supply using a second frequency band, and a power management circuit configured to charge a battery using the received power. The power management circuit may be configured to charge the battery in a first charging mode. The communication circuit may be configured to, when a specified condition is met, transmit information indicating that it is able to enable a second charging mode to the power supply. The power management circuit may be configured to, when power corresponding to the second charging mode is received from the power supply in response to the transmission of the information indicating that it is able to enable the second charging mode, charge the battery in the second charging mode.

In accordance with another aspect of the present disclosure, an electronic device is provided. The electronic device may include a power receiving antenna configured to receive power from a power supply using a first frequency band, a communication circuit configured to communicate with the power supply using a second frequency band, a power management circuit configured to charge a battery using the received power, and a control circuit configured to be electrically connected with the power management circuit. The power management circuit may be configured to charge the battery in a first charging mode in a first state where the power management circuit is enabled and where the control circuit is disabled, when the electronic device enters a second state where both the power management circuit and the control circuit are enabled from the first state, charge the battery in a second charging mode, and setting the first charging mode in the second state. The communication circuit may be configured to transmit information about the setting of the first charging mode to the power supply. The power management circuit may be configured to, when power corresponding to the first charging mode is received from the power supply in response to the transmission, charge the battery in the first charging mode.

According to embodiments disclosed in the present disclosure, an electronic device may change to a fast charge mode during normal charging and may change to a normal charge mode during fast charging. In addition, various effects directly or indirectly ascertained through the present disclosure may be provided.

DETAILED DESCRIPTION

Figure 1:
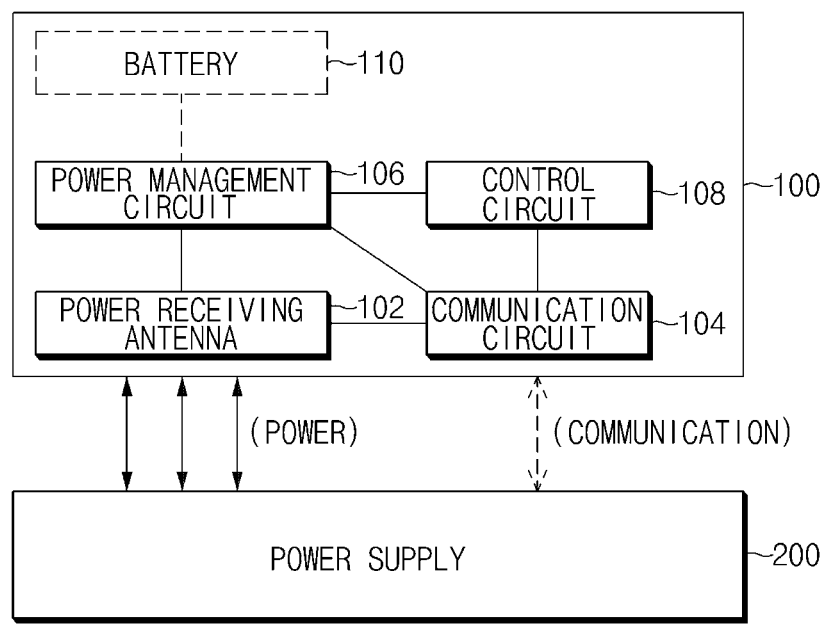
FIG. 1 illustrates a block diagram of an electronic device and a power supply according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates a block diagram of an electronic device and a power supply according to an embodiment.

As shown in FIG. 1, an electronic device 100 may include a power receiving antenna 102, a communication circuit 104, a power management circuit 106, a control circuit 108, and a battery 110. The battery 110 may be a built-in battery embedded in the electronic device 100 when manufactured and may be a removable battery capable of being detached from the electronic device 100 by a user.

The power receiving antenna 102 may wirelessly receive power supplied from the power supply 200 and may supply the received power to the power management circuit 106. The power receiving antenna 102 may include a resonant circuit and may receive power in the form of an electromagnetic wave via the resonant circuit. The resonant circuit may include a coil, and inductance of the coil may be changed.

The communication circuit 104 may perform communication with the power supply 200 in a predetermined manner. The communication circuit 104 may perform communication with the power supply 200 using near field communication (NFC), Zigbee communication, infrared data association communication, visible light communication, Bluetooth communication, Bluetooth low energy (BLE), or the like. The communication circuit 104 may use a carrier sense multi access/collision avoidance (CSMA/CA) algorithm. The above-mentioned communication modes are illustrative, and the spirit and scope of embodiments of the present disclosure is not limited by a specific communication mode performed by the communication circuit 104.

The communication circuit 104 may receive information of the power supply 200. The information of the power supply 200 may include error information generated in the power supply 200 or a TA terminal is pushed in the like. Furthermore, the communication circuit 104 may receive information associated with controlling a charging function of the electronic device 100 from the power supply 200. The information associated with controlling the charging function may be information for controlling the power receiving antenna 102 and enabling or disabling the charging function.

The communication circuit 104 may transmit power information to the power supply 200. Herein, the power information may include at least one of capacity of the battery 110 in the electronic device 100, the number of times of charging the battery 110, and usage of the battery 100. Furthermore, the power information may include information indicating that it is able to enable a fast charge mode during a normal charge mode or information indicating that it is able to enable the normal charge mode during the fast charge mode. Furthermore, the power information may include information indicating that it is able to continue charging the battery 110 in the normal charge mode.

In FIG. 1, it is shown that the electronic device 100 and the power supply 200 are configured with different hardware to communicate in an out-band manner, but it is illustrative. In the present disclosure, the power receiving antenna 102 and the communication circuit 104 may be implemented with one piece of hardware to communicate with the power supply 200 in an in-band manner. The power receiving antenna 102 and the communication circuit 104 may transmit and receive a variety of information. Thus, a charging process through wireless power transmission and reception may be performed, and the above-mentioned process will be described in detail below.

The power management circuit 106 may receive power from the power receiving antenna 102 and may charge the battery 110 in a normal charge mode or a fast charge mode. The power management circuit 106 may change a charging mode depending on a state of the battery 110. The charging mode is not limited to the normal charge mode or the fast charge mode. For example, the power management circuit 106 may perform slow, normal, or fast charging or may charge the battery 110 using any one of a first, second, or third charging mode.

The control circuit 108 may determine whether to charge the battery 110 in the normal charge mode or the fast charge mode based on information received via the communication circuit 104. Furthermore, the control circuit 108 may control an overall operation of the electronic device 100. The control circuit 108 may control the overall operation of the electronic device 100 using, for example, an algorithm, a program, or an application stored in a memory of the electronic device 100. The control circuit 108 may be implemented in the form of an application processor (AP), a central processing unit (CPU), or a microprocessor.

Figure 2:
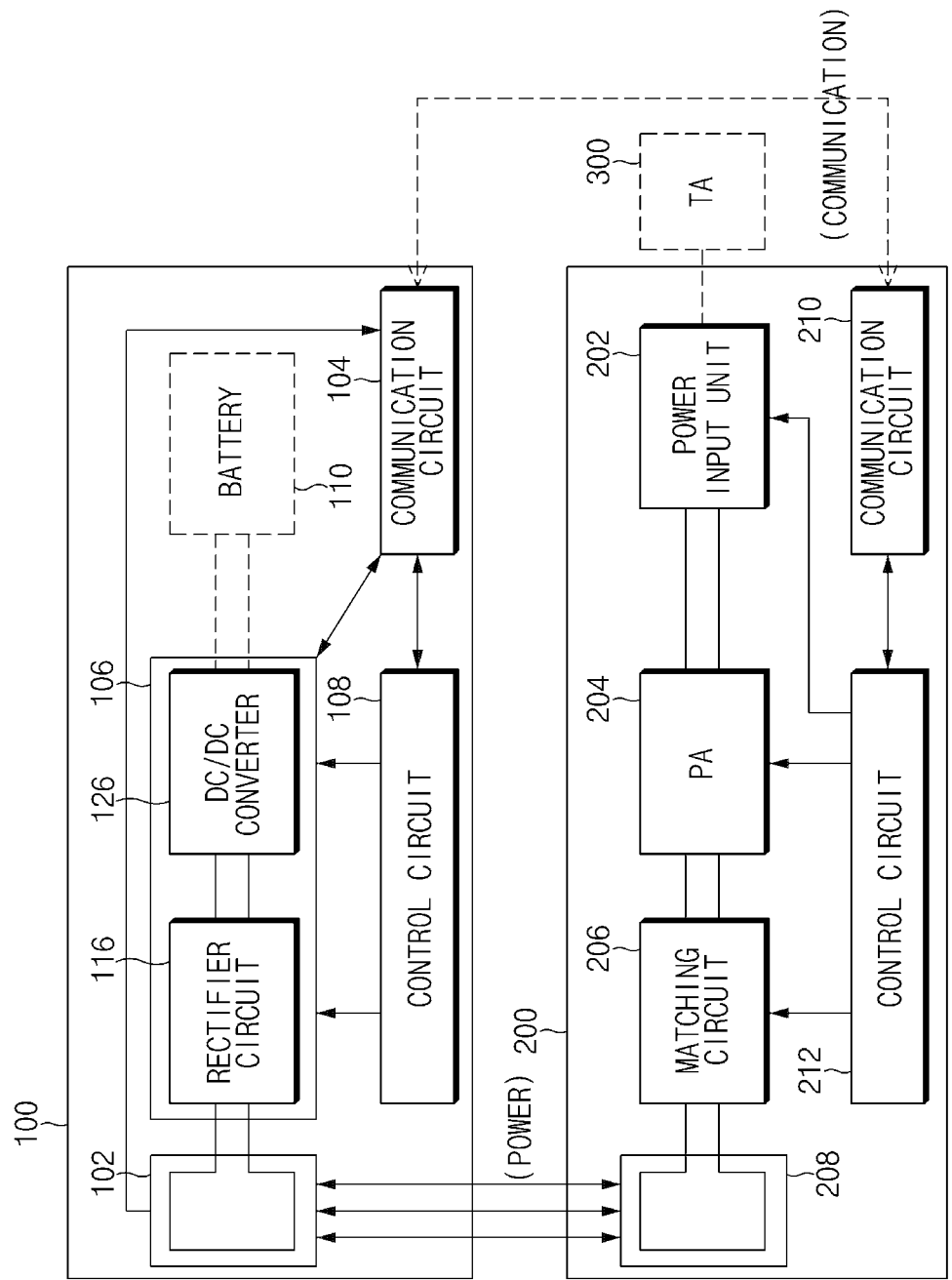
FIG. 2 illustrates a detailed block diagram of an electronic device and a power supply according to an embodiment.

FIG. 2 illustrates a detailed block diagram of an electronic device 100 and a power supply 200 according to an embodiment. In the block diagram of FIG. 2, the details described in FIG. 1 are applicable to components having the same reference numerals as the electronic device 100 and the power supply 200 described in FIG. 1.

As shown in FIG. 2, the electronic device 100 may include a power receiving antenna 102, a communication circuit 104, a power management circuit 106, a control circuit 108, and a battery 110.

The power receiving antenna 102 may receive a charging power from a power transmitting antenna 208. As an embodiment, the power receiving antenna 102 may receive power from the power supply 200 using a first frequency band (e.g., 6.78 MHz).

The communication circuit 104 may transmit and receive a variety of information with a communication circuit 210 of the power supply 200. The communication circuit 104 may communicate with the communication circuit 210 of the power supply 200 using a second frequency band (e.g., 2.4 GHz).

The power management circuit 106 may include a rectifier circuit 116 and a DC/DC converter 126. The rectifier circuit 116 may rectify power received from the power receiving antenna 102 and may be implemented in the form of a bridge diode. The DC/DC converter 126 may convert the rectified power with a predetermined gain. For example, the DC/DC converter 126 may convert the rectified power such that a voltage of an output end connected with the battery 110 is 5 V.

The power management circuit 106 may charge the battery 110 in a first charging mode. Next, when a specified condition is met, the communication circuit 104 may transmit information indicating that it is able to enable a second charging mode to the power supply 200.

As an embodiment, when a level of power to be supplied from the power receiving antenna 102 to the power management circuit 106 changes from a first power value to a second power value, the communication circuit 104 may transmit information indicating that it is able to enable the second charging mode to the power supply 200. The specified condition may be that the level of the power to be supplied to the power management circuit 106 changes from the first power value to the second power value. The first charging mode may be a normal charge mode, and the second charging mode may be a fast charge mode. The first power value may be 9.9 W as a power value corresponding to the first charging mode, and the second power value may be 15.6 W as a power value corresponding to the second charging mode. That is, when a level of power to be supplied to the power management circuit 106 changes from 9.9 W to 15.6 W while the battery 110 is charged in the normal charge mode, the communication circuit 104 may transmit information indicating that it is able to enable the fast charge mode.

As an embodiment, when the electronic device 100 is in an airplane mode, the communication circuit 104 may transmit information indicating that it is able to enable the second charging mode to the power supply 200. The specified condition may be that the electronic device 100 in the airplane mode. Herein, the first charging mode may be the fast charge mode, and the second charging mode may be the normal charge mode. According to an embodiment of the present disclosure, when the electronic device 100 enters the airplane mode while charging the battery 110 in the fast charge mode, it may charge the battery 100 in the normal charge mode. Meanwhile, when the electronic device 100 enters the airplane mode, the power supply 200 may stop supplying power. Moreover, when the electronic device 100 enters the airplane mode, the power supply 200 may transfer power corresponding to the normal charge mode.

As an embodiment, when the electronic device 100 enters a second state from a first state, the communication circuit 104 may transmit information indicating that it is able to enable the second charging mode to the power supply 200. Herein, the first state may be a state where the power management circuit 106 is enabled and where the control circuit 108 is disabled. The second state may be a state where both the power management circuit 106 and the control circuit 108 are enabled. The specified condition may be that the electronic device 100 enters the second state from the first state. Furthermore, the first charging mode may be the fast charge mode, and the second charging mode may be the normal charge mode. According to an embodiment of the present disclosure, when the electronic device 100 is turned on while charging the battery 110 in the fast charge mode, it may charge the battery 100 in the normal charge mode.

As an embodiment, when the control circuit 108 is enabled from a disabled state, the communication circuit 104 may transmit information indicating that it is able to enable the normal charge mode to the power supply 200. The specified condition may be that the control circuit 108 is enabled from the disabled state. When the control circuit 109 is booted, current consumption may increase, thus resulting in a voltage drop. According to an embodiment of the present disclosure, when the control circuit 108 is booted, there is an effect of preventing a voltage drop by changing to the normal charge mode.

The power receiving antenna 102 may receive power corresponding to the second charging mode from the power supply 200 in response to the transmission of the information indicating that it is able to enable the second charging mode. The power management circuit 106 may be configured to, when power corresponding to the second charging mode is received from the power supply 200, charge the battery 110 in the second charge mode. As an embodiment, when power corresponding to the fast charge mode is received from the power supply 200 during charging in the normal charge mode, the power management circuit 106 may charge the battery 110 in the fast charge mode. Moreover, when power corresponding to the normal charge mode is received from the power supply 200 during charging in the fast charge mode, the power management circuit 106 may charge the battery 110 in the normal charge mode.

The power supply 200 may include a power input unit 202, a power amplifier (PA) 204, a matching circuit 206, the power transmitting antenna 208, a communication circuit 210, and a control circuit 212.

The power input unit 202 may receive power from a TA 300 depending on a type of the TA 300 and may supply power to the electronic device 100 via the power transmitting antenna 208. For example, when the TA 300 is a 5V TA, the power supply 200 may supply a power of 9.9 W to the electronic device 100. When the TA 300 is a 9V TA, the power supply 200 may supply a power of 15.6 W to the electronic device 100. In addition, an example of various TA voltages and supply powers is possible.

The PA 204 may amplify power with a predetermined gain and may output the amplified power to the matching circuit 206. Furthermore, the PA 204 may include an AC generator circuit. The AC generator circuit may convert DC input from the power input unit 202 into AC and may output the converted AC to the matching circuit 206. Moreover, the PA 204 may convert DC into AC based on a signal input from the control circuit 212 and may output the converted AC to the matching circuit 206. Furthermore, the PA 204 may amplify the converted AC with a predetermined gain and may output the amplified AC to the matching circuit 206.

The matching circuit 206 may perform impedance matching. For example, the matching circuit 206 may include one or more coils and capacitors, and the control circuit 212 may control a state where the coils and the capacitors are connected. When the control circuit controls the state where the coils and the capacitors are connected, the matching circuit 206 may perform impedance matching. The matching circuit 206 may enhance efficiency of an output power and may increase a level of the output power by performing impedance matching.

The power transmitting antenna 208 may transfer the input power to the power receiving antenna 102. The power transmitting antenna 208 and the power receiving antenna 102 may be implemented with resonant circuits, each of which has the same resonant frequency. For example, the resonant frequency may be 6.78 MHz.

The communication circuit 210 may communicate with the communication circuit 104 of the electronic device 100. For example, the communication circuit 210 may perform bidirectional communication (Wi-Fi, ZigBee, or BT/BLE) using a frequency of 2.4 GHz.

The control circuit 212 may control to supply power to the electronic device 100 based on information received from the communication circuit 210 and may control an overall operation of the power supply 200.

Figure 3:
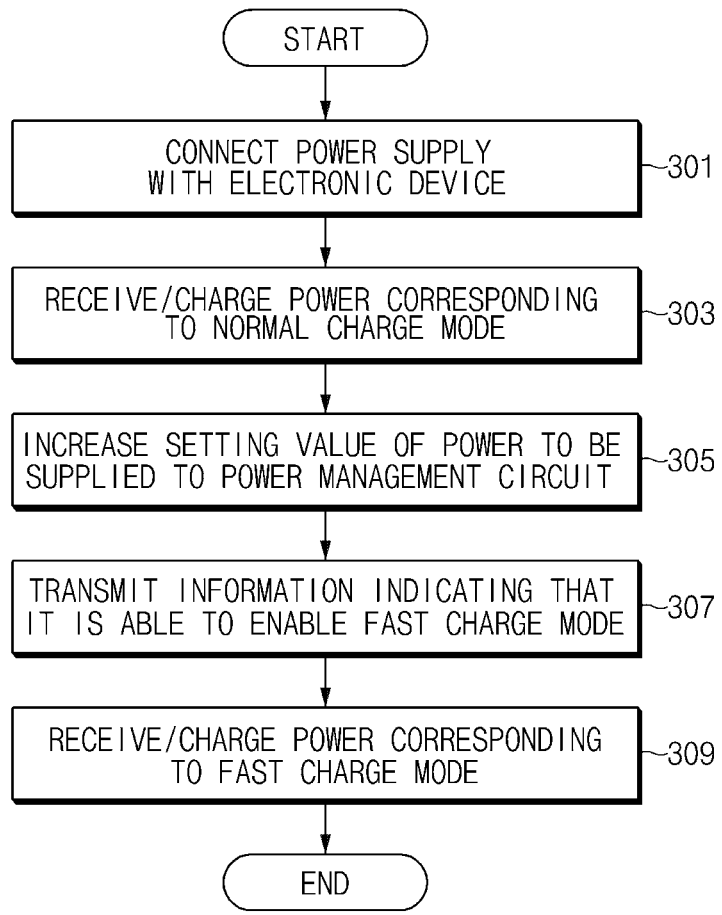
FIG. 3 illustrates a flowchart for changing from a normal charge mode to a fast charge mode according to an embodiment.

FIG. 3 illustrates a flowchart for changing from a normal charge mode to a fast charge mode according to an embodiment.

Referring to FIGS. 2 and 3, in operation 301, a power supply 200 and an electronic device 100 may be connected with each other. A communication circuit 104 in the electronic device 100 may transmit PRU advertisement information for a connection with the power supply. The PRU advertisement information may be information indicating an address in a network of the electronic device 100 and will be described below together with FIG. 4.

When the communication circuit 104 transmits the PRU advertisement information, the power supply 200 may transmit information for a connection with the electronic device 100. The electronic device 100 may perform the connection with the power supply 200 based on the information received from the power supply 200.

When the power supply 200 and the electronic device 100 are connected with each other, the power supply 200 may transfer power corresponding to a normal charge mode. In operation 303, the electronic device 100 may receive the power corresponding to the normal charge mode and may charge a battery 110. When a specified condition is met while charging the battery 110 with the power corresponding to the normal charge mode, in operation 305, the electronic device 100 may increase a setting value of power to be supplied to a power management circuit 106. For example, when a level of power capable of being supplied to the electronic device 100 at the power supply 200 is higher than a level of the power corresponding to the normal charge mode, the electronic device 100 may increase a setting value of power to be supplied to the power management circuit 106.

When the level of the power to be supplied to the power management circuit 106 is increased by a predetermined power value, in operation 307, the communication circuit 104 may transmit information indicating that it is able to enable a fast charge mode to the power supply 200. When receiving the information indicating that it is able to enable the fast charge mode, the power supply device 200 may transfer power corresponding to the fast charge mode. In operation 309, the electronic device 100 may receive the power corresponding to the fast charge mode and may charge the battery 110.

Figure 4:
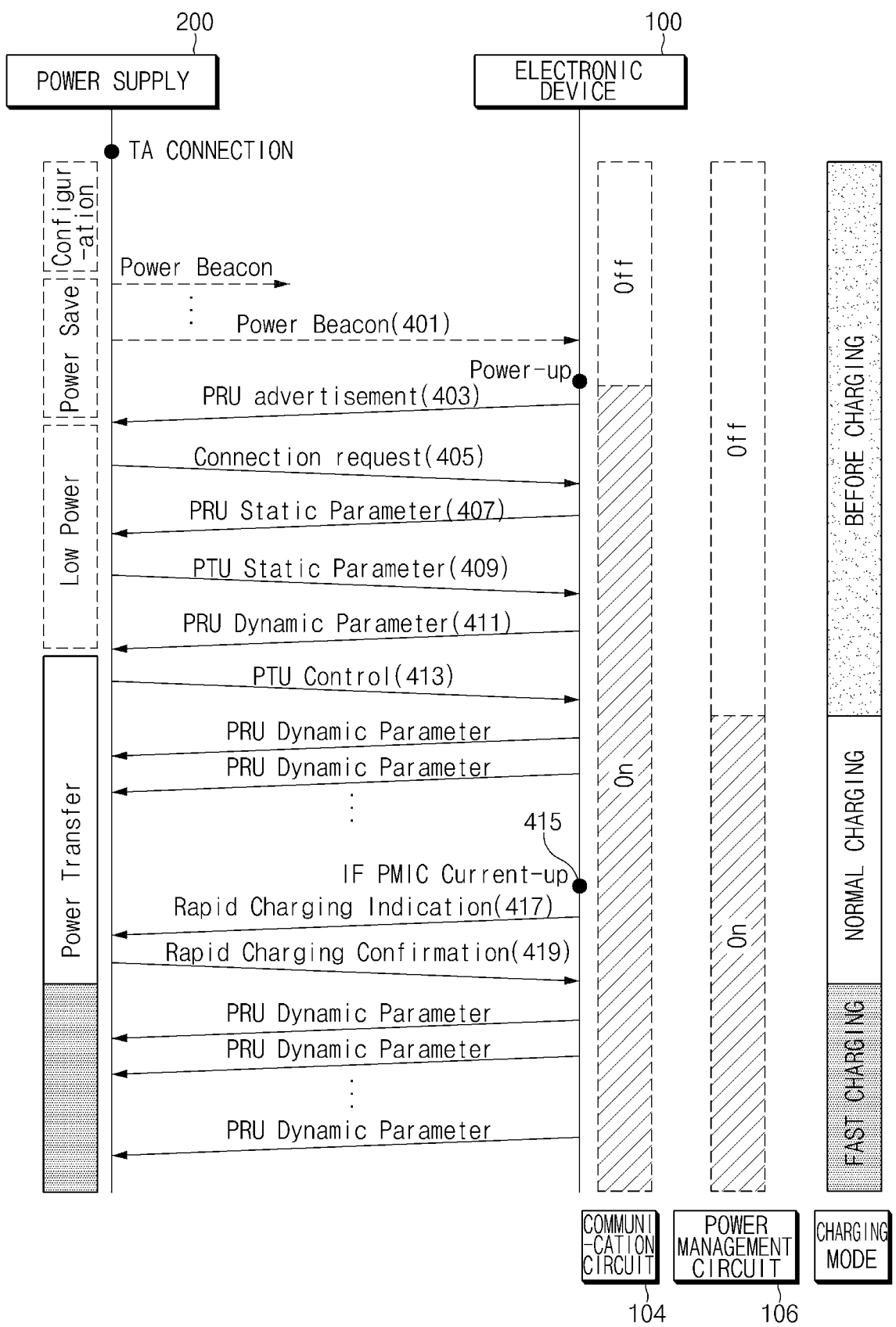
FIG. 4 illustrates a signal sequence diagram for changing a charging mode in a state where an electronic device is powered off, according to an embodiment.

FIG. 4 illustrates a signal sequence diagram for changing a charging mode in a state where an electronic device is powered off, according to an embodiment. In the signal sequence diagram of FIG. 4, the details described in FIG. 2 are applicable to components having the same reference numerals as a communication circuit 104, a power management circuit 106, an electronic device 100, and a power supply 200 described in FIG. 2.

Referring to FIGS. 2 and 4, first of all, a TA 300 may be connected to the power supply 200. The power supply 200 may amplify power supplied from the TA 300 and may transfer the amplified power to the electronic device 100. For example, when a voltage of the TA 300 is 5 V, the power supply 200 may transfer a power of 9.9 W to the electronic device 100. In this case, the electronic device 100 may charge a battery 100 in a normal charge mode. When a voltage of the TA 300 is 9 V, the power supply 200 may transfer a power of 15.6 W to the electronic device 100. In this case, the electronic device 100 may charge the battery 110 in a fast charge mode.

When the TA 300 is connected to the power supply 200, the power supply 200 may configure an environment and may enable each component of the power supply 200. When each component of the power supply 200 is enabled, the power supply 200 may enter a power save mode and may transmit a power bean 401 to the electronic device 100 via a power transmitting antenna. The power supply 200 may transmit the power beacon 401 at a certain period and may transmit the power beacon 401 at any period.

The power beacon 401 may be power for turning on a communication circuit 104 of the electronic device 100, and each level of the power beacon 401 may vary. The power beacon 401 may resonate with a power receiving antenna 102 of the electronic device 100 such that current flows in the communication circuit 104. When current flows in the communication circuit 104, the communication circuit 104 may be turned on from a turn-off state to transmit and receive a variety of information necessary for a wireless power.

When the communication circuit 104 is turned on, it may transmit information 403 indicating an address in a network of the electronic device 100 to the power supply 200. For example, the information 403 indicating the address in the network of the electronic device 100 may be PRU advertisement information. The communication circuit 104 may search the power supply 200 using the PRU advertisement information. The communication circuit 104 may transmit the information 403 at a certain period and may transmit the information 403 until receiving a response signal from the power supply 200.

The communication circuit 104 may transmit the information 403 indicating the address in the network. Next, the communication circuit 104 may receive a connection request 405 to connect the power supply 200 with the electronic device 100 from the power supply 200. When the communication circuit 104 receives the connection request 405, the power supply 200 and the electronic device 100 may be in a state where they are connected with each other to transmit and receive a variety of information and power.

The communication circuit 104 may transmit a parameter (PRU static parameter(s)) 407 associated with a charging function of the electronic device 100 to the power supply 200. The parameter 407 may include information about a type of the electronic device 100 and a maximum amount of power the electronic device 100 may accept.

The communication circuit 104 may receive a parameter (PTU static parameter(s)) 409 associated with a charging function of the power supply 200. The parameter 409 may include information about a type of the power supply 200 and a maximum amount of power the power supply may supply.

When the electronic device 100 and the power supply 200 exchange the parameters 407 and 409, the electronic device 100 may determine whether the type of the electronic device 100 is identical to the type of the power supply 200. When the type of the electronic device 100 is identical to the type of the power supply 200, the communication circuit 104 may transmit an optimal parameter (a PRU dynamic parameter) 411 for charging the battery 110 to the power supply 200. The parameter 411 may include information about an optimal voltage value for charging the battery and an optimal current value for charging the battery.

When the communication circuit 104 transmits the parameter 411, the power supply 200 may transmit information 413 (PTU control) indicating a level of power capable of being supplied from the power supply 200 to the electronic device 100. The level of the power capable of being supplied from the power supply 200 may vary with the TA 300 connected to the power supply 200. For example, when a voltage of the TA 300 is 5 V, the level of the power capable of being supplied from the power supply 200 may be 9.9 W. When a voltage of the TA 300 is 9 V, the level of the power capable of being supplied from the power supply 200 may be 15.6 W.

As an embodiment, the information 413 may include information for enabling or disabling the power receiving antenna 102. For example, the information 413 may be to resonate with the power receiving antenna 102 and charge the battery 110 in a normal charge mode. Furthermore, the information 413 may be to stop charging the battery 100 by stopping resonating with the power receiving antenna 102.

In the embodiment shown in FIG. 4, since the 9V TA is connected, the level of the power capable of being supplied from the power supply 200 may be 15.6 W. Herein, when the power supply 200 immediately increase and decrease power in response to a time when the electronic device 100 rapidly changes a level of current to be supplied to the power management circuit 106, there may be a risk that a circuit will be damaged. Thus, the power supply 200 may first transfer a power of 9.9 W, and the power management circuit 106 may charge the battery 110 in the normal charge mode.

While the battery 110 is charged in the normal charge mode, when a setting value of power to be supplied to the power management circuit 106 changes from 9.9 W to 15.6 W, the communication circuit 104 may transmit information 417 to the power supply 200. The information 417 may be information indicating that it is able to charge the battery 110 in the fast charge mode. When the power supply 200 receives the information 417, it may transfer 15.6 W which is power corresponding to the fast charge mode and the electronic device 100 may charge the battery 110 in the fast charge mode.

According to the above-mentioned embodiment of the present disclosure, there is an effect of receiving another power depending on the TA 300 by detecting whether the TA 300 is a TA for fast charging or normal charging. Moreover, according to the above-mentioned embodiment of the present disclosure, there is an effect that the electronic device 100 may select a charging mode in various manners in a maximum power supported by the power supply 200 by receiving another power depending on the TA 300 connected to the power supply 200.

As an embodiment, the communication circuit 104 may transmit information indicating whether overvoltage or overcurrent is applied to the battery 110. Herein, the information indicating whether the overvoltage or overcurrent is applied to the battery 110 may be information indicating a state of the battery 110 and may be PRU alert information. The information indicating whether the overvoltage or overcurrent is applied to the battery 110 may include a charging level of the battery 110 and a temperature of the battery 110. When the communication circuit 104 transmits the information indicating whether the overvoltage or overcurrent is applied to the battery 110 to the power supply 200, the power supply 200 may stop transferring power.

According to an embodiment of the present disclosure, there is an effect of preventing the battery 110 from exploding and extending the life of the battery 110 by adjusting whether to charge the battery 110 depending on a state of the battery 110.

Figure 5:
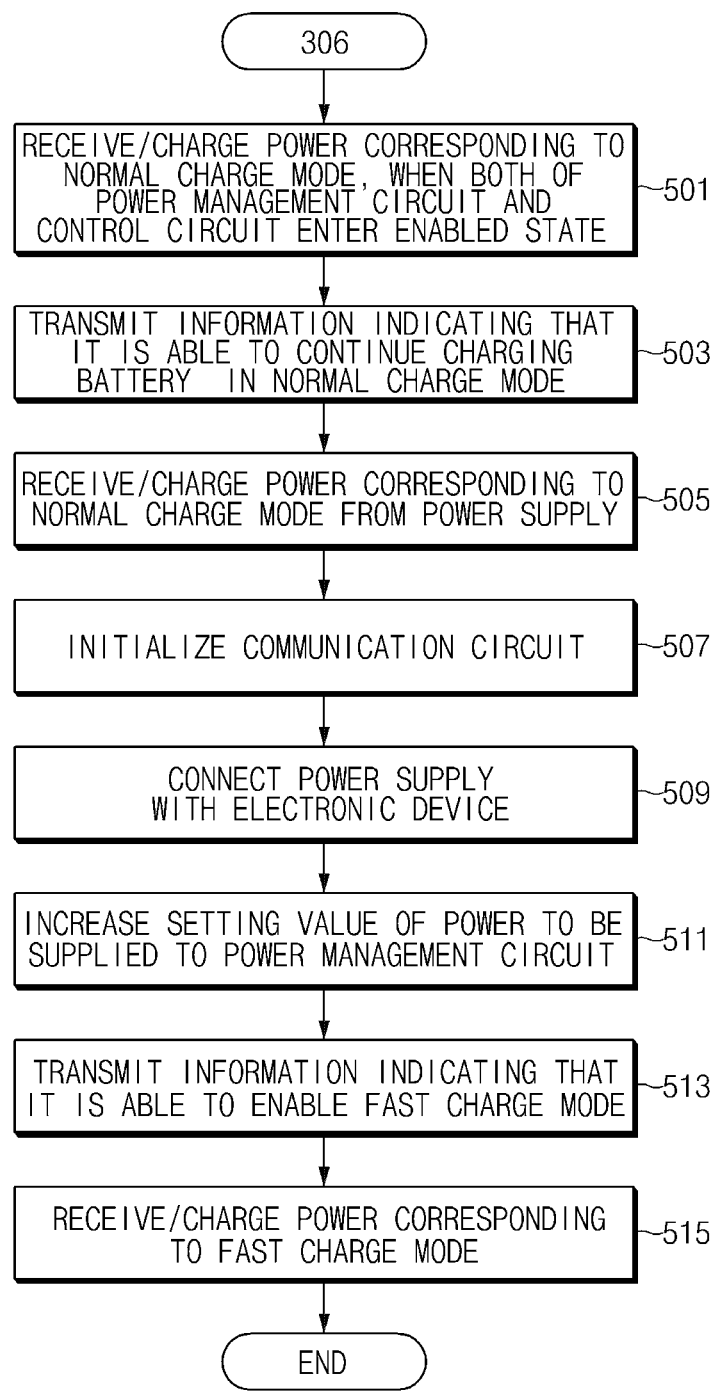
FIG. 5 illustrates a flowchart for changing a charging mode according to another embodiment.
Figure 6:
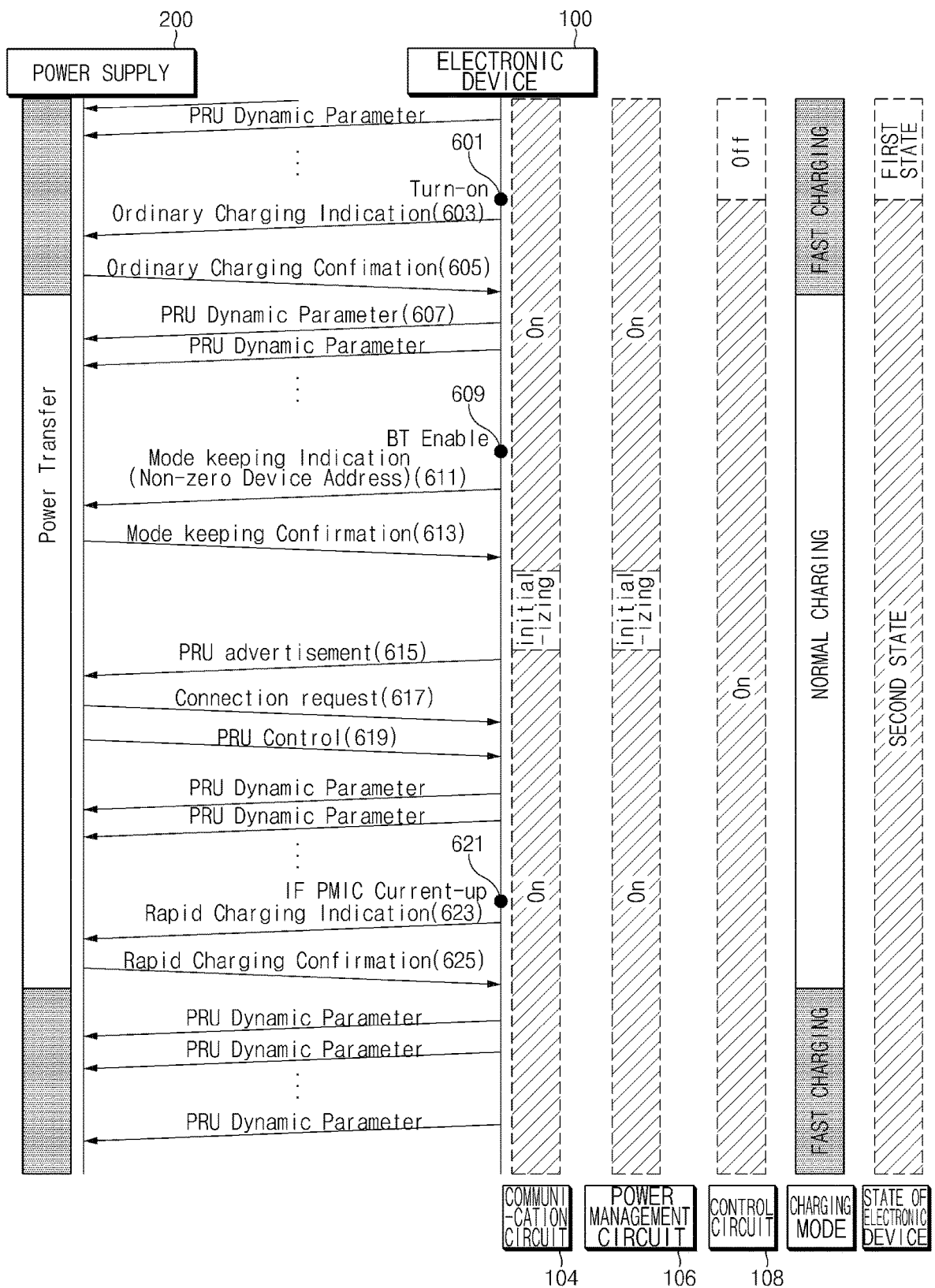
FIG. 6 illustrates a signal sequence diagram for changing a charging mode as an electronic device is powered on during fast charging according to another embodiment.

FIG. 5 illustrates a flowchart for changing a charging mode according to another embodiment. FIG. 6 illustrates a signal sequence diagram for changing a charge mode as an electronic device is powered on during fast charging according to another embodiment. Hereinafter, a description will be given of another embodiment of the present disclosure with reference to FIGS. 2, 5, and 6. The other embodiment of the prevent disclosure may be a process performed subsequent to the embodiment described in FIGS. 2 to 4. Contrary to the embodiment described in FIGS. 2 to 4, in the other embodiment of the present disclosure, a first charging mode may be a fast charge mode and a second charging mode may be a normal charge mode.

Referring again to FIG. 2, a control circuit 108 may be electrically connected with a power management circuit 106. Moreover, the control circuit 108 may be connected with a communication circuit 104, and may adjust a setting value of power supplied to the power management circuit 106 by controlling the power management circuit 106 and the communication circuit 104.

The power management circuit 106 may charge a battery 110 in a first charging mode in a first state where the power management circuit 106 is enabled and where the control circuit 108 is disabled. When an electronic device 100 enters a second state where both the power management circuit 106 and the control circuit 108 are enabled from the first state, the power management circuit 106 may charge the battery 110 in a second charging mode.

In another embodiment of the present disclosure, the first state may be a state where only the power management circuit 106 and the communication circuit 104 are turned on. The second state may be a state where a user pushes a power button disposed on one surface of the electronic device 100 to turn on the electronic device 100. Furthermore, in the second state, all components included in the electronic device 100 may be initialized.

The power management circuit 106 may set the first charging mode in the second state, and the communication circuit 104 may transmit information about the setting of the first charging mode to the power supply 200. When power corresponding to the first charging mode is received from the power supply 200 in response to the transmission of the information about the setting of the first charging mode, the power management circuit 106 may charge the battery 110 in the first charging mode.

For example, the power management circuit 106 may be configured such that a setting value of power to be supplied to the power management circuit 106 increases from 9.9 W to 15.6 W in a normal charge state. Next, the communication circuit 104 may transmit information indicating that the power management circuit 106 may charge the battery 110 in a fast charge mode to the power supply 200. After receiving the information indicating that it is able to charge the battery 110 in the fast charge mode, the power supply 200 may transfer power (e.g., 15.6 W) corresponding to the fast charge mode to the electronic device 100. When the power supply 200 transfers the power (e.g., 15.6 W) corresponding to the fast charge mode, the power management circuit 106 may charge the battery 110 in the fast charge mode.

Referring to FIGS. 2 and 5, in operation 501, when both the power management circuit 106 and the control circuit 108 enter an enabled state during fast charging, the power management circuit 106 may receive power corresponding to a normal charge mode and may charge the battery 100. When both the power management circuit 106 and the control circuit 108 enter the enabled state, the communication circuit 104 may transmit information for requesting the normal charge mode to the power supply 200. The power supply 200 may transmit power (e.g., 9.6 W) corresponding to the normal charge mode in response to the information for requesting the normal charge mode.

During charging in the fast charge mode, when the user pushes the power button located on the one surface of the electronic device 100, both the power management circuit 106 and the control circuit 108 may enter the enabled state. When the control circuit 108 enters the enabled state, it may initialize the communication circuit 104. Since charging is able to be stopped when the communication circuit 104 is initialized, in operation 503, the communication circuit 104 may transmit information indicating that it is able to charge the battery 110 in the normal charge mode to the electronic device 100. In operation 505, the power supply 200 may continue transferring the power corresponding to the normal charge mode to the electronic device 100, and the electronic device 100 may receive the power corresponding to the normal charge mode from the power supply 200 and may charge the battery 110 in the normal charge mode. In operation 505, the electronic device 100 may stop normal charging while the communication circuit 104 and the power management circuit 106 are initialized and may continue performing the normal charging when the initialization is ended. Furthermore, while the communication circuit 104 and the power management circuit 106 are initialized, the electronic device 100 may continue performing the normal charging.

When the communication circuit 104 is initialized in operation 507, all information about the power supply 200, stored in a memory, may be cleared. When all the information stored in the memory is cleared, in operation 509, the communication circuit 104 may connect the power supply 200 with the electronic device 100 to receive the information about the power supply 200 from the power supply 200.

When the power supply 200 and the electronic device 100 are connected with each other, in operation 511, the power management circuit 106 may increase a setting value of power to be supplied to the power management circuit 106. For example, when a level of power capable of being charged by the power supply 200 is higher than a level of power corresponding to the normal charge mode, the electronic device 100 may increase a setting value of power to be supplied to the power management circuit 106.

When the level of the power to be supplied to the power management circuit 106 is increased by a predetermined power value, in operation 513, the communication circuit 104 may transmit information indicating that it is able to enable a fast charge mode to the power supply 200. In operation 515, the power supply 200 may transfer power corresponding to the fast charge mode, and the electronic device 100 may receive the power corresponding to the fast charge mode and may charge the battery 100.

Referring to FIGS. 2 and 6, in operation 601, when a pressure of greater than or equal to a predetermined pressure value is applied to one surface of the electronic device 100, the electronic device 100 may enter a second state from a first state. For example, when the user pushes the power button located on the one surface of the electronic device 100, the electronic device 100 may enter the second state from the first state.

When the electronic device 100 enters the second state, the communication circuit 104 may transmit information 603 indicating that it is able to enable a second charging mode to the power supply 200. The power management circuit 106 may be configured to, when the communication circuit 104 transmits the information 603 to the power supply 200, charge the battery 110 in the second charging mode in response to the transmission of the information 603.

That is, when the electronic device 100 is turned on while charging the battery 100 in the fast charge mode, the communication circuit 104 may transmit information indicating that it is able to enable the normal charge mode to the power supply 200. Next, the power management circuit 106 may charge the battery 110 in the normal charge mode in response to the transmission of the information 603 indicating that it is able to enable the normal charge mode.

When the electronic device 100 is turned on, the power management circuit 106 may be initialized and a level of power capable of being supplied to the power management circuit 106 may decrease. Thus, when the electronic device 100 is turned on, although a setting value of power to be supplied from the power receiving antenna 102 to the power management circuit 106 is not increased, the power corresponding to the fast charge mode may be supplied. When the power corresponding to the fast charge mode is supplied, heat may be generated and the power management circuit 106 may be damaged or may perform an error operation due to the generated heat. Thus, according to an embodiment of the present disclosure, there is an effect of preventing the power management circuit 106 from being damaged by changing a mode from the fast charge mode to the normal charge mode when the electronic device 100 is turned on.

After entering the second state from the first state, in operation 609, the control circuit 108 may initialize the communication circuit 104 in response to the enabling of the control circuit 108. The communication circuit 104 may transmit information 611 (mode keeping indication) indicating that it is able to continue charging the battery 110 in the second charging mode to the power supply 200 in response to the enabling. The information 611 indicating that it is able to continue charging the battery 110 in the second charging mode may be information indicating that the power management circuit 106 may continue charging the battery 110 in the second charging mode.

When the communication circuit 104 transmits the information 611 to the power supply 200, the power supply 200 may continue transferring power corresponding to the second charging mode to the electronic device 100. Next, the electronic device 100 may charge the battery 110 in the second charging mode. The electronic device 100 may stop charging the battery 110 while the communication circuit 104 and the power management circuit 160 are initialized and may continue charging the battery 100 in the second charging mode when the initialization is ended. Furthermore, the electronic device 100 may continue charging the battery 100 in the second charging mode while the communication circuit 104 and the power management circuit 106 are initialized. Charging is stopped in the process that the control circuit 108 initializes the communication circuit 104 in the related art, but, according to an embodiment of the present disclosure, there is an effect that the power supply 200 may continue supplying power while the communication circuit 104 is initialized.

After the communication circuit 104 is initialized, it may transmit information 615 (PRU advertisement) indicating an address in a network of the electronic device 100 to the power supply 200. The information 615 may be the same as information 403 described in FIG. 4. When the electronic device 100 is turned on, since all information about the power supply 200, stored in the memory, is cleared, the communication circuit 104 may transmit the information 615 to receive the information about the power supply 200.

As an embodiment, the information 615 indicating the address in the network of the electronic device 100 may include a parameter (PRU static parameter(s)) associated with a charging function of the electronic device 100. The parameter associated with the charging function of the electronic device 100 may be the same as a parameter 407 described in FIG. 4. After transmitting the information 615, the communication circuit 104 may receive a connection request 617 for connecting the power supply 200 with the electronic device 100 from the power supply 200. The connection request 617 may be the same as a connection request 405 described in FIG. 4.

When the electronic device 100 and the power supply 200 are connected with each other, the communication circuit 104 may receive a parameter (PTU static parameter(s)) associated with a charging function of the power supply 200 from the power supply 200. The parameter associated with the charging function of the power supply 200 may be the same as a parameter 409 described in FIG. 4.

When the communication circuit 104 exchanges the parameter associated with the charging function of the electronic device 100 and the parameter associate with the charging function of the power supply 200, the power management circuit 106 may determine whether a type of the electronic device 100 is identical to a type of the power supply 200. The power management circuit 106 may be configured to, when the type of the electronic device 100 and the type of the power supply 200 are identical to each other, charge the battery 110 in the second charging circuit. Herein, the type of the electronic device 100 and the type of the power supply 200 may be identical to a type of the electronic device 100 and a type of the power supply 200, described in FIG. 4.

When the electronic device 100 and the power supply 200 are connected with each other, the communication circuit 104 may receive information 619 (PTU control) indicating a level of power capable of being supplied from the power supply 200 from the power supply 200. The information 619 may be the same as information 413 described in FIG. 4.

The power management circuit 106 may set the first charging mode based on a level of power capable of being supplied from the power supply 200. For example, when the level of the power capable of being supplied from the power supply 200 is higher than a level of power corresponding to the second charging mode, the power management circuit 106 may set the first charging mode.

A level of power capable of being supplied from the power supply 200 in the normal charge mode may be 9.9 W, and a level of power capable of being supplied from the power supply 200 in the fast charge mode may be 15.6 W. Thus, in operation 621, the power supply 200 may transfer a power of 15.6 W and the power management circuit 106 may set the fast charge mode.

After the power management circuit 106 sets the fast charge mode, the communication circuit 104 may transmit information 623 about the setting of the fast charge mode to the power supply 200. The power management circuit 106 may fast charge the battery 110 in response to the transmission of the information 623.

As an embodiment, the power management circuit 106 may increase a level of power to be supplied to the power management circuit 106 by a predetermined power value and may set the first charging mode. When a level of power capable of being supplied from the power supply 200 during normal charging is power (e.g., 15.6 W) corresponding to the fast charge mode, the power management circuit 106 may increase a setting value of power to be supplied to the power management circuit 106 from 9.9 W to 15.6 W. When the setting value of the power to be supplied to the power management circuit 106 increases from 9.9 W to 15.6 W, the power management circuit 106 may charge the battery 110 in the fast charge mode.

According to the above-mentioned embodiment of the present disclosure, there is an effect of receiving another power depending on the TA 300 by detecting whether the TA 300 is a TA for fast charging or normal charging. Furthermore, according to the above-mentioned embodiment of the present disclosure, there is an effect that the electronic device 100 may select a charging mode in various manners within a maximum power supported by the power supply 200 by receiving another power depending on the TA 300 connected to the power supply 200.

Figure 7:
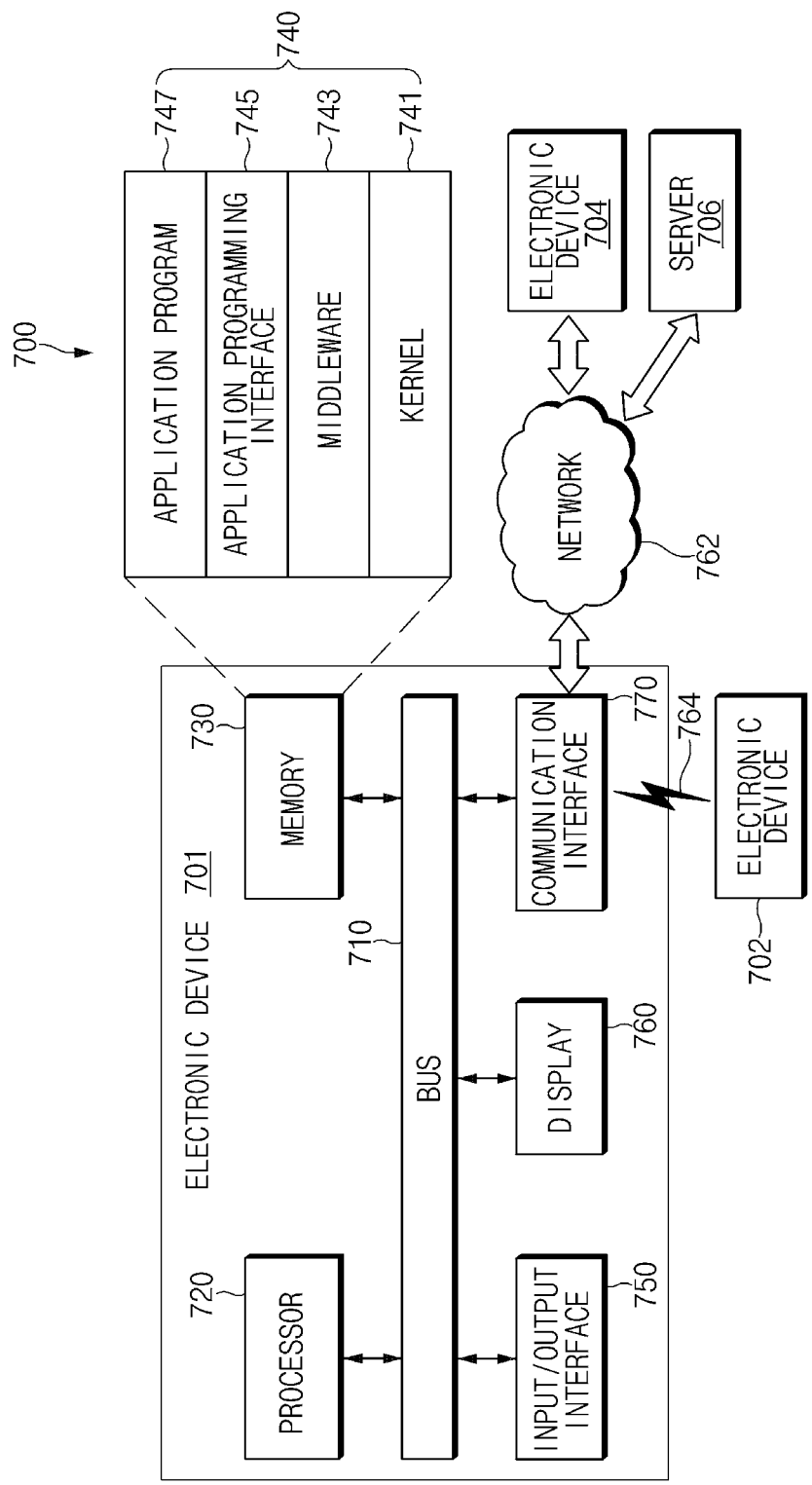
FIG. 7 illustrates an electronic device in a network environment, according to an embodiment.

FIG. 7 illustrates an electronic device in a network environment, according to an embodiment.

Referring to FIG. 7, according to various embodiments, an electronic device 701, a first electronic device 702, a second electronic device 704, or a server 706 may be connected each other over a network 762 or a short range communication 764. The electronic device 701 may include a bus 710, a processor 720, a memory 730, an input/output interface 750, a display 760, and a communication interface 770. According to an embodiment, the electronic device 701 may not include at least one of the above-described components or may further include other component(s).

For example, the bus 710 may interconnect the above-described components 720 to 770 and may include a circuit for conveying communications (e.g., a control message and/or data) among the above-described components.

The processor 720 may include one or more of a central processing unit (CPU), an application processor (AP), or a communication processor (CP). For example, the processor 720 may perform an arithmetic operation or data processing associated with control and/or communication of at least other components of the electronic device 701.

The memory 730 may include a volatile and/or nonvolatile memory. For example, the memory 730 may store commands or data associated with at least one other component(s) of the electronic device 701. According to an embodiment, the memory 730 may store software and/or a program 740. The program 740 may include, for example, a kernel 741, a middleware 743, an application programming interface (API) 745, and/or an application program (or "an application") 747. At least a part of the kernel 741, the middleware 743, or the API 745 may be referred to as an "operating system (OS)".

For example, the kernel 741 may control or manage system resources (e.g., the bus 710, the processor 720, the memory 730, and the like) that are used to execute operations or functions of other programs (e.g., the middleware 743, the API 745, and the application program 747). Furthermore, the kernel 741 may provide an interface that allows the middleware 743, the API 745, or the application program 747 to access discrete components of the electronic device 701 so as to control or manage system resources.

The middleware 743 may perform, for example, a mediation role such that the API 745 or the application program 747 communicates with the kernel 741 to exchange data.

Furthermore, the middleware 743 may process task requests received from the application program 747 according to a priority. For example, the middleware 743 may assign the priority, which makes it possible to use a system resource (e.g., the bus 710, the processor 720, the memory 730, or the like) of the electronic device 701, to at least one of the application program 747. For example, the middleware 743 may process the one or more task requests according to the priority assigned to the at least one, which makes it possible to perform scheduling or load balancing on the one or more task requests.

The API 745 may be, for example, an interface through which the application program 747 controls a function provided by the kernel 741 or the middleware 743, and may include, for example, at least one interface or function (e.g., an instruction) for a file control, a window control, image processing, a character control, or the like.

The input/output interface 750 may play a role, for example, of an interface which transmits a command or data input from a user or another external device, to other component(s) of the electronic device 701. Furthermore, the input/output interface 750 may output a command or data, received from other component(s) of the electronic device 701, to a user or another external device.

The display 760 may include, for example, a liquid crystal display (LCD), a light-emitting diode (LED) display, an organic LED (OLED) display, a microelectromechanical systems (MEMS) display, or an electronic paper display. The display 760 may display, for example, various contents (e.g., a text, an image, a video, an icon, a symbol, and the like) to a user. The display 760 may include a touch screen and may receive, for example, a touch, gesture, proximity, or hovering input using an electronic pen or a part of a user's body.

For example, the communication interface 770 may establish communication between the electronic device 701 and an external device (e.g., the first electronic device 702, the second electronic device 704, or the server 706). For example, the communication interface 770 may be connected to the network 762 over wireless communication or wired communication to communicate with the external device (e.g., the second electronic device 704 or the server 706).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 764. The short range communication 764 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 701 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 762 may include at least one of telecommunications networks, for example, a computer network (e.g., LAN or WAN), an Internet, or a telephone network.

Each of the first and second electronic devices 702 and 704 may be a device of which the type is different from or the same as that of the electronic device 701. According to an embodiment, the server 706 may include a group of one or more servers. According to various embodiments, all or a portion of operations that the electronic device 701 will perform may be executed by another or plural electronic devices (e.g., the first electronic device 702, the second electronic device 704 or the server 706). According to an embodiment, in the case where the electronic device 701 executes any function or service automatically or in response to a request, the electronic device 701 may not perform the function or the service internally, but, alternatively additionally, it may request at least a portion of a function associated with the electronic device 701 from another device (e.g., the electronic device 702 or 704 or the server 706). The other electronic device may execute the requested function or additional function and may transmit the execution result to the electronic device 701. The electronic device 701 may provide the requested function or service using the received result or may additionally process the received result to provide the requested function or service. To this end, for example, cloud computing, distributed computing, or client-server computing may be used.

Figure 8:
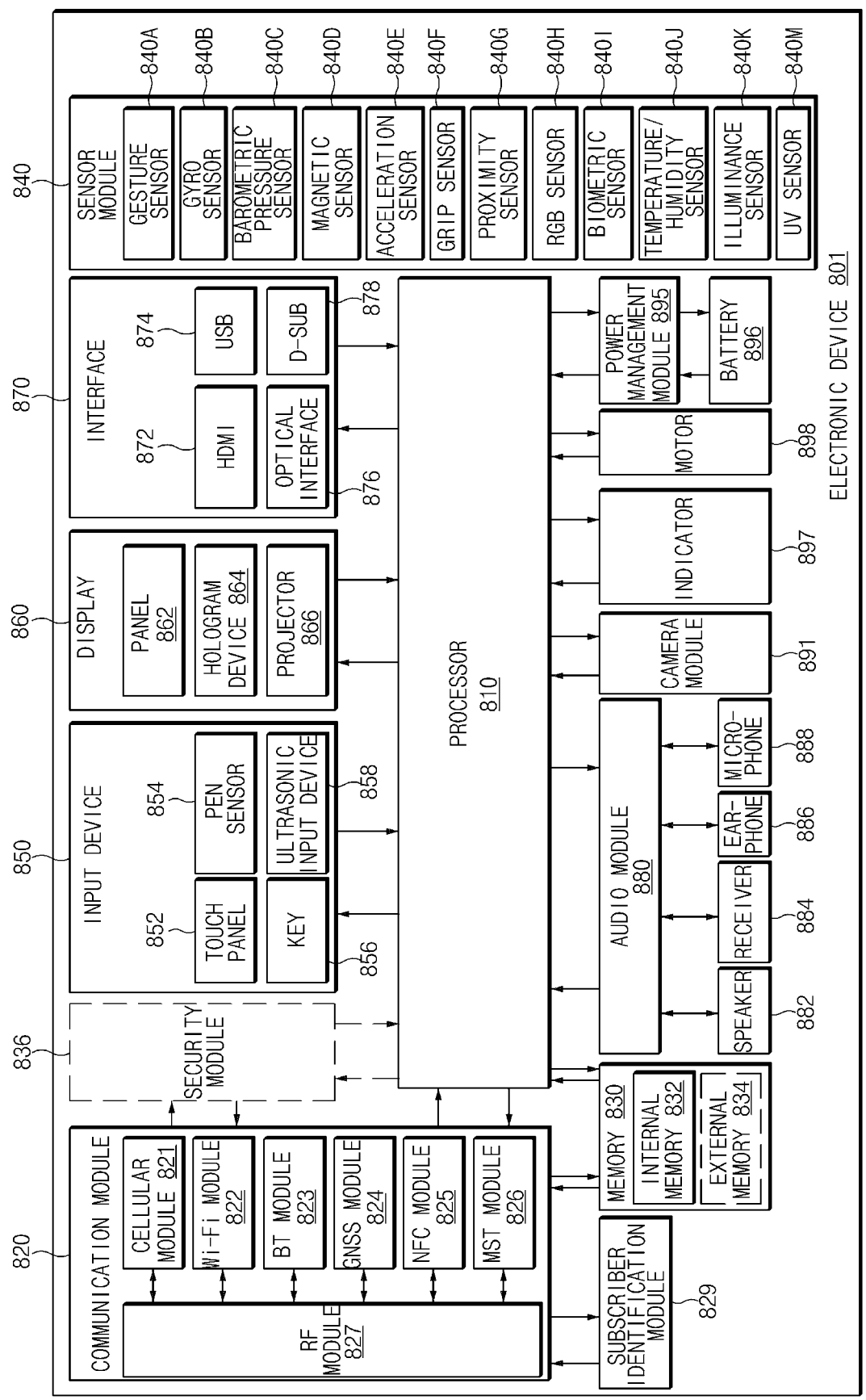
FIG. 8 illustrates a block diagram of an electronic device, according to an embodiment.

FIG. 8 illustrates a block diagram of an electronic device, according to an embodiment.

Referring to FIG. 8, an electronic device 801 may include, for example, all or a part of the electronic device 701 illustrated in FIG. 7. The electronic device 801 may include one or more processors (e.g., an application processor (AP)) 810, a communication module 820, a subscriber identification module 829, a memory 830, a sensor module 840, an input device 850, a display 860, an interface 870, an audio module 880, a camera module 891, a power management module 895, a battery 896, an indicator 897, and a motor 898.

The processor 810 may drive, for example, an operating system (OS) or an application to control a plurality of hardware or software components connected to the processor 810 and may process and compute a variety of data. For example, the processor 810 may be implemented with a System on Chip (SoC). According to an embodiment, the processor 810 may further include a graphic processing unit (GPU) and/or an image signal processor. The processor 810 may include at least a part (e.g., a cellular module 821) of components illustrated in FIG. 8. The processor 810 may load a command or data, which is received from at least one of other components (e.g., a nonvolatile memory), into a volatile memory and process the loaded command or data. The processor 810 may store a variety of data in the nonvolatile memory.

The communication module 820 may be configured the same as or similar to the communication interface 770 of FIG. 7. The communication module 820 may include the cellular module 821, a Wi-Fi module 822, a Bluetooth (BT) module 823, a GNSS module 824 (e.g., a GPS module, a Glonass module, a Beidou module, or a Galileo module), a near field communication (NFC) module 825, a MST module 826 and a radio frequency (RF) module 827.

The cellular module 821 may provide, for example, voice communication, video communication, a character service, an Internet service, or the like over a communication network. According to an embodiment, the cellular module 821 may perform discrimination and authentication of the electronic device 801 within a communication network by using the subscriber identification module (e.g., a SIM card) 829. According to an embodiment, the cellular module 821 may perform at least a portion of functions that the processor 810 provides. According to an embodiment, the cellular module 821 may include a communication processor (CP).

Each of the Wi-Fi module 822, the BT module 823, the GNSS module 824, the NFC module 825, or the MST module 826 may include a processor for processing data exchanged through a corresponding module, for example. According to an embodiment, at least a part (e.g., two or more) of the cellular module 821, the Wi-Fi module 822, the BT module 823, the GNSS module 824, the NFC module 825, or the MST module 826 may be included within one Integrated Circuit (IC) or an IC package.

For example, the RF module 827 may transmit and receive a communication signal (e.g., an RF signal). For example, the RF module 827 may include a transceiver, a power amplifier module (PAM), a frequency filter, a low noise amplifier (LNA), an antenna, or the like. According to another embodiment, at least one of the cellular module 821, the Wi-Fi module 822, the BT module 823, the GNSS module 824, the NFC module 825, or the MST module 826 may transmit and receive an RF signal through a separate RF module.

The subscriber identification module 829 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 830 (e.g., the memory 730) may include an internal memory 832 or an external memory 834. For example, the internal memory 832 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 834 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 834 may be operatively and/or physically connected to the electronic device 801 through various interfaces.

A security module 836 may be a module that includes a storage space of which a security level is higher than that of the memory 830 and may be a circuit that guarantees safe data storage and a protected execution environment. The security module 836 may be implemented with a separate circuit and may include a separate processor. For example, the security module 836 may be in a smart chip or a secure digital (SD) card, which is removable, or may include an embedded secure element (eSE) embedded in a fixed chip of the electronic device 801. Furthermore, the security module 836 may operate based on an operating system (OS) that is different from the OS of the electronic device 801. For example, the security module 836 may operate based on java card open platform (JCOP) OS.

The sensor module 840 may measure, for example, a physical quantity or may detect an operation state of the electronic device 801. The sensor module 840 may convert the measured or detected information to an electric signal. For example, the sensor module 840 may include at least one of a gesture sensor 840A, a gyro sensor 840B, a barometric pressure sensor 840C, a magnetic sensor 840D, an acceleration sensor 840E, a grip sensor 840F, the proximity sensor 840G, a color sensor 840H (e.g., red, green, blue (RGB) sensor), a biometric sensor 840I, a temperature/humidity sensor 840J, an illuminance sensor 840K, or an UV sensor 840M. Although not illustrated, additionally or alternatively, the sensor module 840 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 840 may further include a control circuit for controlling at least one or more sensors included therein. According to an embodiment, the electronic device 801 may further include a processor that is a part of the processor 810 or independent of the processor 810 and is configured to control the sensor module 840. The processor may control the sensor module 840 while the processor 810 remains at a sleep state.

The input device 850 may include, for example, a touch panel 852, a (digital) pen sensor 854, a key 856, or an ultrasonic input unit 858. For example, the touch panel 852 may use at least one of capacitive, resistive, infrared and ultrasonic detecting methods. Also, the touch panel 852 may further include a control circuit. The touch panel 852 may further include a tactile layer to provide a tactile reaction to a user.

The (digital) pen sensor 854 may be, for example, a part of a touch panel or may include an additional sheet for recognition. The key 856 may include, for example, a physical button, an optical key, a keypad, or the like. The ultrasonic input device 858 may detect (or sense) an ultrasonic signal, which is generated from an input device, through a microphone (e.g., a microphone 888) and may check data corresponding to the detected ultrasonic signal.

The display 860 (e.g., the display 760) may include a panel 862, a hologram device 864, or a projector 866. The panel 862 may be the same as or similar to the display 760 illustrated in FIG. 7. The panel 862 may be implemented, for example, to be flexible, transparent or wearable. The panel 862 and the touch panel 852 may be integrated into a single module. The hologram device 864 may display a stereoscopic image in a space using a light interference phenomenon. The projector 866 may project light onto a screen so as to display an image. For example, the screen may be arranged in the inside or the outside of the electronic device 801. According to an embodiment, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, or a D-sub-miniature (D-sub) 878. The interface 870 may be included, for example, in the communication interface 770 illustrated in FIG. 7. Additionally or alternatively, the interface 870 may include, for example, a mobile high definition link (MHL) interface, a SD card/multi-media card (MMC) interface, or an infrared data association (IrDA) standard interface.

The audio module 880 may convert a sound and an electric signal in dual directions. At least a component of the audio module 880 may be included, for example, in the input/output interface 750 illustrated in FIG. 7. The audio module 880 may process, for example, sound information that is input or output through a speaker 882, a receiver 884, an earphone 886, or the microphone 888.

For example, the camera module 891 may shoot a still image or a video. According to an embodiment, the camera module 891 may include at least one or more image sensors (e.g., a front sensor or a rear sensor), a lens, an image signal processor (ISP), or a flash (e.g., an LED or a xenon lamp).

The power management module 895 may manage, for example, power of the electronic device 801. According to an embodiment, a power management integrated circuit (PMIC), a charger IC, or a battery or fuel gauge may be included in the power management module 895. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 896 and a voltage, current or temperature thereof while the battery is charged. The battery 896 may include, for example, a rechargeable battery and/or a solar battery.

The indicator 897 may display a specific state of the electronic device 801 or a part thereof (e.g., the processor 810), such as a booting state, a message state, a charging state, and the like. The motor 898 may convert an electrical signal into a mechanical vibration and may generate the following effects: vibration, haptic, and the like. Although not illustrated, a processing device (e.g., a GPU) for supporting a mobile TV may be included in the electronic device 801. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 9:
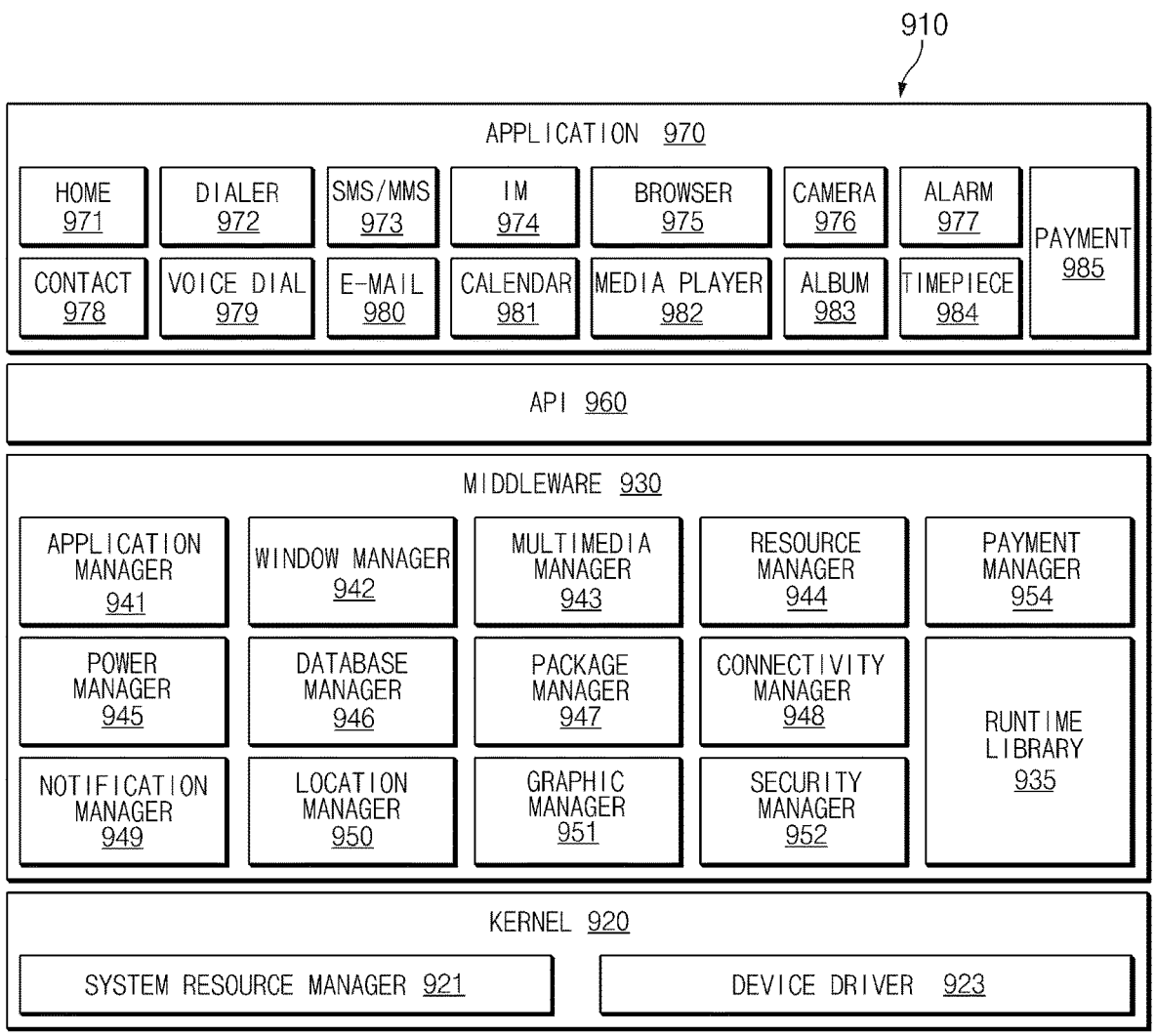
FIG. 9 illustrates a block diagram of a program module, according to an embodiment.

FIG. 9 illustrates a block diagram of a program module, according to an embodiment.

According to an embodiment, a program module 910 (e.g., the program 740) may include an operating system (OS) to control resources associated with an electronic device (e.g., the electronic device 701), and/or diverse applications (e.g., the application program 747) driven on the OS. The OS may be, for example, Android™, iOS™, Windows™, Symbian™, or Tizen™.

The program module 910 may include a kernel 920, a middleware 930, an application programming interface (API) 960, and/or an application 970. At least a portion of the program module 910 may be preloaded on an electronic device or may be downloadable from an external electronic device (e.g., the first electronic device 702, the second electronic device 704, the server 706, or the like).

The kernel 920 (e.g., the kernel 741) may include, for example, a system resource manager 921 or a device driver 923. The system resource manager 921 may perform control, allocation, or retrieval of system resources. According to an embodiment, the system resource manager 921 may include a process managing unit, a memory managing unit, or a file system managing unit. The device driver 923 may include, for example, a display driver, a camera driver, a Bluetooth driver, a shared memory driver, a USB driver, a keypad driver, a Wi-Fi driver, an audio driver, or an inter-process communication (IPC) driver.

The middleware 930 may provide, for example, a function that the application 970 needs in common, or may provide diverse functions to the application 970 through the API 960 to allow the application 970 to efficiently use limited system resources of the electronic device. According to an embodiment, the middleware 930 (e.g., the middleware 743) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, a security manager 952, or a payment manager 954.

The runtime library 935 may include, for example, a library module that is used by a compiler to add a new function through a programming language while the application 970 is being executed. The runtime library 935 may perform input/output management, memory management, or capacities about arithmetic functions.

The application manager 941 may manage, for example, a life cycle of at least one application of the application 970. The window manager 942 may manage a graphic user interface (GUI) resource that is used in a screen. The multimedia manager 943 may identify a format necessary for playing diverse media files, and may perform encoding or decoding of media files by using a codec suitable for the format. The resource manager 944 may manage resources such as a storage space, memory, or source code of at least one application of the application 970.

The power manager 945 may operate, for example, with a basic input/output system (BIOS) to manage a battery or power, and may provide power information for an operation of an electronic device. The database manager 946 may generate, search for, or modify database that is to be used in at least one application of the application 970. The package manager 947 may install or update an application that is distributed in the form of package file.

The connectivity manager 948 may manage, for example, wireless connection such as Wi-Fi or Bluetooth. The notification manager 949 may display or notify an event such as arrival message, appointment, or proximity notification in a mode that does not disturb a user. The location manager 950 may manage location information about an electronic device. The graphic manager 951 may manage a graphic effect that is provided to a user, or manage a user interface relevant thereto. The security manager 952 may provide a general security function necessary for system security, user authentication, or the like. According to an embodiment, in the case where an electronic device (e.g., the electronic device 701) includes a telephony function, the middleware 930 may further include a telephony manager for managing a voice or video call function of the electronic device.

The middleware 930 may include a middleware module that combines diverse functions of the above-described components. The middleware 930 may provide a module specialized to each OS kind to provide differentiated functions. Additionally, the middleware 930 may dynamically remove a part of the preexisting components or may add new components thereto.

The API 960 (e.g., the API 745) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 970 (e.g., the application program 747) may include, for example, one or more applications capable of providing functions for a home 971, a dialer 972, an SMS/MMS 973, an instant message (IM) 974, a browser 975, a camera 976, an alarm 977, a contact 978, a voice dial 979, an e-mail 980, a calendar 981, a media player 982, an album 983, a timepiece 984, and a payment 985 or for offering health care (e.g., measuring an exercise quantity, blood sugar, or the like) or environment information (e.g., information of barometric pressure, humidity, temperature, or the like).

According to an embodiment, the application 970 may include an application (hereinafter referred to as "information exchanging application" for descriptive convenience) to support information exchange between an electronic device (e.g., the electronic device 701) and an external electronic device (e.g., the first electronic device 702 or the second electronic device 704). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 970 may include an application (e.g., a health care application of a mobile medical device) that is assigned in accordance with an attribute of an external electronic device. According to an embodiment, the application 970 may include an application that is received from an external electronic device (e.g., the first electronic device 702, the second electronic device 704, or the server 706). According to an embodiment, the application 970 may include a preloaded application or a third party application that is downloadable from a server. The names of components of the program module 910 according to the embodiment may be modifiable depending on kinds of operating systems.

According to various embodiments, at least a portion of the program module 910 may be implemented by software, firmware, hardware, or a combination of two or more thereof. At least a portion of the program module 910 may be implemented (e.g., executed), for example, by the processor (e.g., the processor 810). At least a portion of the program module 910 may include, for example, modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 720), may cause the one or more processors to perform a function corresponding to the instruction. The computer-readable storage media, for example, may be the memory 730.

A non-transitory storage medium may store computer-readable instructions that, when executed by an electronic device, cause the electronic device to receive power using a first frequency band from a power supply, communicate with the power supply using a second frequency band, charge a battery using power supplied via a power receiving antenna, charge the battery in a first charging mode, transmit information indicating that it is able to enable a second charging mode to the power supply, when a specified condition is met, and charge the battery in the second charging mode in response to the transmission of the information.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device, comprising:
   a power receiving antenna configured to receive power from a power supply using a first frequency band;
   a communication circuit configured to communicate with the power supply using a second frequency band;
   a power management circuit configured to charge a battery using the received power; and a control circuit configured to be electrically connected with the power management circuit,
wherein the power management circuit is configured to:
charge the battery in a first charging mode in a first state where the power management circuit is enabled and where the control circuit is disabled;
when the electronic device enters a second state where both the power management circuit and the control circuit are enabled from the first state, charge the battery in a second charging mode; and
setting the first charging mode in the second state,
wherein the communication circuit is configured to transmit information about the setting of the first charging mode to the power supply, and
wherein the power management circuit is configured to:
when power corresponding to the first charging mode is received from the power supply in response to the transmission, charge the battery in the first charging mode.

2. The electronic device of claim 1, wherein the communication circuit is configured to:
when the electronic device enters the second state, transmit information indicating that it is able to enable the second charging mode to the power supply, and
wherein the power management circuit is configured to charge the battery in the second charging mode in response to the transmission of the information indicating that it is able to enable the second charging mode.

3. The electronic device of claim 1, wherein the electronic device is configured to:
when a pressure of greater than or equal to a predetermined pressure value is applied to one surface of the electronic device, enter the second state from the first state.

4. The electronic device of claim 1, wherein the communication circuit is configured to:
transmit information indicating an address in a network of the electronic device to the power supply in the second state; and
receive information for connecting the power supply with the electronic device from the power supply.

5. The electronic device of claim 4, wherein the information indicating the address in the network of the electronic device comprises information associated with a charging function of the electronic device.

6. The electronic device of claim 1, wherein the communication circuit is configured to receive information indicating a level of power capable of being supplied from the power supply in the second state from the power supply, and
wherein the power management circuit is configured to set the first charging mode based on the level of the power capable of being supplied from the power supply.

7. The electronic device of claim 1, wherein the control circuit is configured to initialize the communication circuit in the second state in response to the enabling of the control circuit,
wherein the communication circuit is configured to transmit information indicating that it is able to continue charging the battery in the second charging mode to the power supply in response to the initialization, and
wherein the power management circuit is configured to:
when power corresponding to the second charging mode is received from the power supply, charge the battery in the second charging mode.

8. The electronic device of claim 6, wherein the information indicating the level of the power capable of being supplied from the power supply comprises information for enabling or disabling the power receiving antenna.

9. The electronic device of claim 1, wherein the communication circuit is configured to:
when a level of power to be supplied from the power receiving antenna to the power management circuit changes from a first power value corresponding to the first charging mode to a second power value corresponding to the second charging mode, transmit information indicating that it is able to enable the second charging mode to the power supply.

10. The electronic device of claim 1, wherein the communication circuit is configured to:
when a power beacon for turning on the communication circuit is received from the power supply, be enabled.

11. The electronic device of claim 1, wherein the communication circuit is configured to:
transmit information associated with a charging function of the electronic device to the power supply; and
receive information associated with a charging function of the power supply.

12. The electronic device of claim 1, wherein the communication circuit is configured to transmit information indicating whether overvoltage or overcurrent is applied to the battery.

* * * * *